April 6, 1965                J. DORY                 3,176,506
                    ULTRASONIC INSPECTION APPARATUS
Filed June 22, 1962                              5 Sheets-Sheet 2

April 6, 1965 J. DORY 3,176,506
ULTRASONIC INSPECTION APPARATUS
Filed June 22, 1962 5 Sheets-Sheet 3
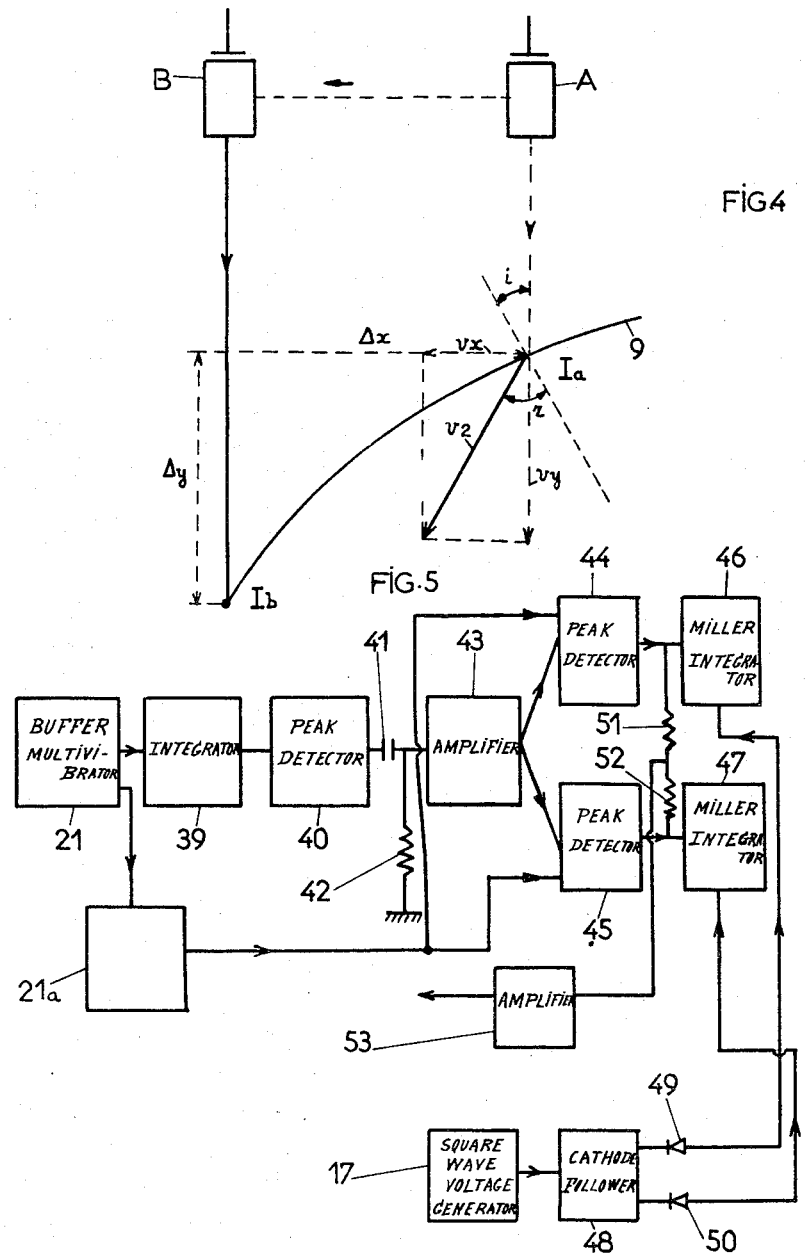

United States Patent Office 3,176,506
Patented Apr. 6, 1965

3,176,506
ULTRASONIC INSPECTION APPARATUS
Jacques Dory, Meaux, France, assignor to Réalisations Ultrasoniques, Meaux, France, a corporation of France
Filed June 22, 1962, Ser. No. 204,501
Claims priority, application France, June 26, 1961, 866,275, Patent 1,300,875
6 Claims. (Cl. 73—67.8)

The present invention relates to a system for inspecting objects by means of ultrasonic waves of the type in which an extended liquid coupling medium is employed between the pulse transmitter and the object to be inspected.

This type of inspection system comprises, as well known in the art, means for transmitting, under the form of recurrent pulses, a beam of ultrasonic waves to the surface of the solid body to be inspected (said surface designated herein as the "front face"), through a fluid medium which promotes the acoustic contact with said body, and means for receiving the echoes resulting from the reflection of the ultrasonic energy waves from the bottom of the piece under inspection or from other reflecting surfaces thereof, and, particularly, defects to be detected therein. These echoes, after having been converted into electric signals, are displayed on the screen of a cathode ray tube. The ultrasonic beam scans the surface of the solid body under inspection at a comparatively low speed, the scanning of the cathode ray tube, for instance in the horizontal direction, being synchronized with the displacement of the ultrasonic beam, while the much faster vertical scanning is synchronized with the rate of the recurrent pulses. Said echo electric signals release the normally blocked electron beam of the cathode ray tube. Thus, a sort of cross-sectional representation of the inspected piece is obtained, the front face, the bottom face and the other reflecting surfaces of which are represented by luminous traces on the screen of the cathode ray tube (said screen being of the type having a suitable afterglow).

Specifically, the vertical scanning is generally initiated at each period of the recurrent pulse train, not directly by the pulse generated by the electric pulse transmitter, but by means of a pulse which is delayed relative to the first one. This delay is generally of a constant duration, established in such a manner that the trace of the front face is located substantially at the top of the cathode ray tube screen.

This expedient has however the disadvantage in that said trace of the front face will not any more reproduce accurately the profile thereof when differing by a straight line. In effect, it may be easily shown that the level differences in the front face will then be, in a way, amplified in the representation, on account of the difference in the speeds of propagation of the ultrasonic waves respectively in the coupling liquid medium and in the solid body under inspection.

In prior art, this difficulty is met with by causing the vertical scanning of the cathode ray tube to be triggered by the electric signal which corresponds to the echo reflected from said front face. This method results however in only suppressing, in the display on the screen, the level differences of the front face and in creating level differences in the opposite sense of the bottom face of the piece.

It is an object of the invention to provide a system for ultrasonic inspection of the type employing a liquid coupling medium, and adapted to deliver a substantially accurate "cross-sectional view" of the piece under inspection, said system being of the type wherein the scanning, for example the vertical scanning, of the screen of the cathode ray tube is initiated by the original transmitted pulse delayed by a constant period of time, or undelayed, wherein said vertical scanning is effected, at each period, at a rate which is proportional to the propagation speed of the ultrasonic waves in the coupling liquid medium, until the moment the first echo obtained from the front face of the piece is displayed, and proportional to the propagation speed within the piece, from said moment and up to the end of said period.

According to a further feature of the invention, the horizontal and the vertical components of the scanning speed are arranged to be, at each instant, substantially proportional to the respective horizontal and vertical components of the propagation speed of the ultrasonic pulses, taking account of the refraction of the ultrasonic beam from the front face of the piece. This feature avoids any deformation of the representation due to the refraction of the ultrasonic beam from said face.

Further objects and advantages of this invention will become apparent in the following description and appended drawings, wherein:

FIG. 4 is a graph of the path followed by the ultrasonic beam when the front face of the body under inspection presents a substantial curvature.

FIG. 5 is a block diagram of a refraction correcting device according to the invention.

Figure 6:
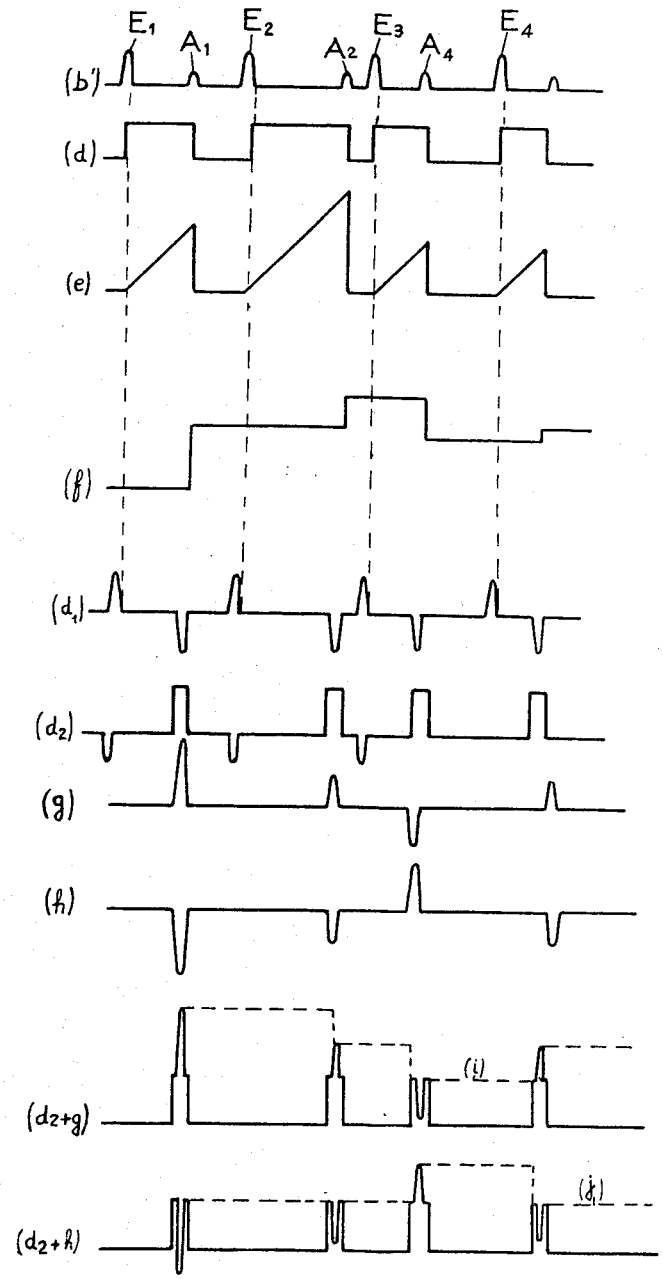

FIG. 6 illustrating the mode of operation thereof.

Figure 7:
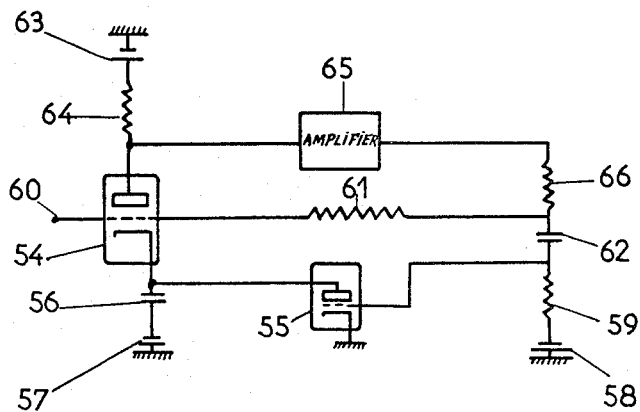

FIG. 7 illustrates an embodiment of a double-threshold peak detecting circuit used in the arrangement shown in FIG. 5.

Figure 1:
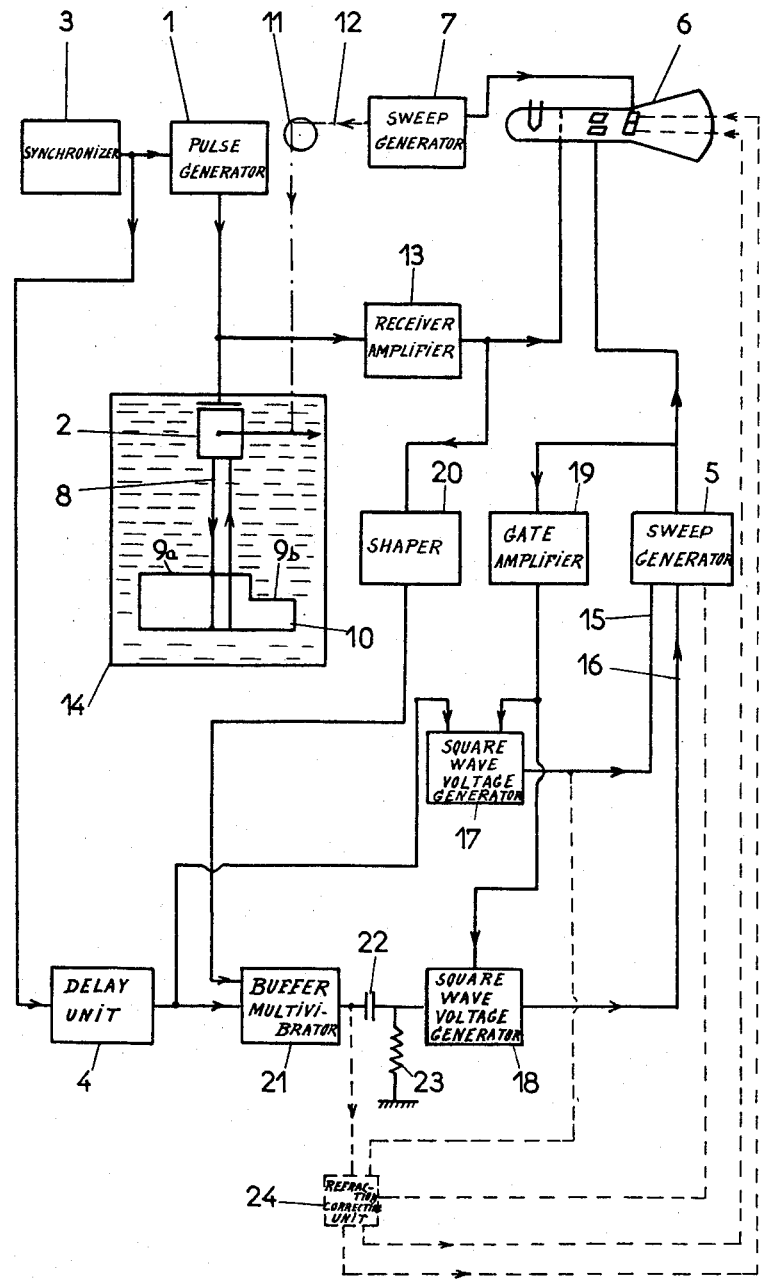
FIG. 1 is a block diagram of a device for inspecting solid bodies by means of ultrasonic waves, according to the invention.

Referring to FIG. 1, there is shown an inspection device comprising, according to the known art, an electronic frequency oscillator adapted when triggered to generate pulses of ultrasonic frequency for driving an electro acoustic transducer 2.

A timing pulse generator 3 generates recurrent pulses which trigger the oscillation of device 1 and moreover is connected to a delay device 4 coupled to a time base generator 5 which controls the vertical scanning of the screen of the cathode ray tube 6.

The horizontal scanning of the screen is controlled by an electric voltage generating device 7, the slope of the voltage produced being proportional, at each instant, to the speed of scanning, by the ultrasonic beam 8 provided by transducer 2, of the front face (9-a—9-b) of the piece 10 to be inspected, and the horizontal scanning of the screen of the cathode ray tube is synchronized with said scanning.

Since the means for displacing the transducer 2 in the direction of the arrow are well known in the art, they have not been illustrated in the drawing, but only indicated symbolically by a circle 11, the broken line 12 indicating, in turn, the connection of generator 7 to said means for controlling the speed of displacement.

Similarly, the receiver amplifier 13 of the electrical signals corresponding to the echoes is also of a known general type. The output of said receiver drives the control electrode of the cathode ray tube.

The transducer 2 and the piece 10 are immersed in a liquid contained in a tank 14.

Figure 2:
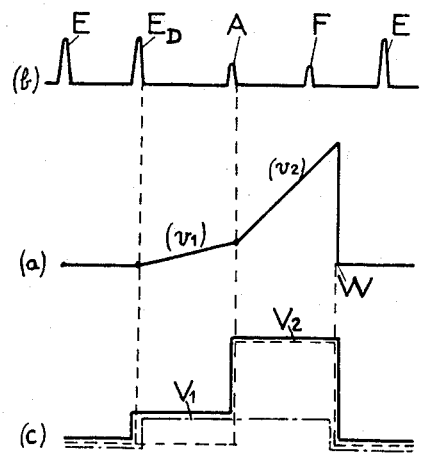
FIG. 2 is a graph illustrating the operation of this device.

According to an essential feature of the invention, the voltage produced by the time base generator 5 has the waveform as shown in (a), FIG. 2.

There is shown in (b) the respective amplitudes and time positions of the recurrent pulses E generated by generator 3, of the pulse $E_D$ delayed by device 4 and of the electric signals corresponding to the first echo A derived from the front face of the piece and of the first echo F derived from the bottom of the piece.

As shown, the scanning voltage corresponds to a first scanning speed $v_1$ between the instants defined by $E_D$ and A and to a second scanning speed $v_2$ between the instant defined by A and the instant W defined by the end of the scanning motion. The latter instant corresponds to the instant defined by F or is slightly later than the same.

It is obvious that the delay interval ($E-E_D$) is adjustable and may even be cancelled if desired.

The speed $v_1$ is proportional to the propagation speed of the ultrasonic energy in the coupling medium, whereas the speed $v_2$ is proportional to the propagation speed of the ultrasonic waves within the piece under inspection. By way of a non limitative example, the case has been considered, with $v_2$ being substantially equal to $4v_1$.

The time-base generator 5, adapted to provide the waveform ($a$), may be preferably designed in such a manner that said waveform will be obtained by applying to the inputs 15 and 16 thereof square wave voltages having, respectively, the waveforms $V_1$ and $V_2$ represented in ($c$), FIG. 2, in broken and in dotted lines, respectively, the amplitudes of these square waves being proportional to the speeds $v_1$ and $v_2$.

The square waves $V_1$ and $V_2$ are generated by the electronic multivibrators 17 and 18, respectively.

In operation, multivibrator 17 is switched from state "zero" to state "one" by the pulse $E_D$ and from state "1" to state "zero" by a pulse transmitted by a threshold or gate amplifier 19 at each end of sweep W. The latter pulse is derived from the sawtooth voltage ($a$), FIG. 2, each time the amplitude of said voltage reaches a level above the threshold of gate amplifier 19. The said threshold is selected in such a way that this will occur at each end of sweep W.

Figure 3:
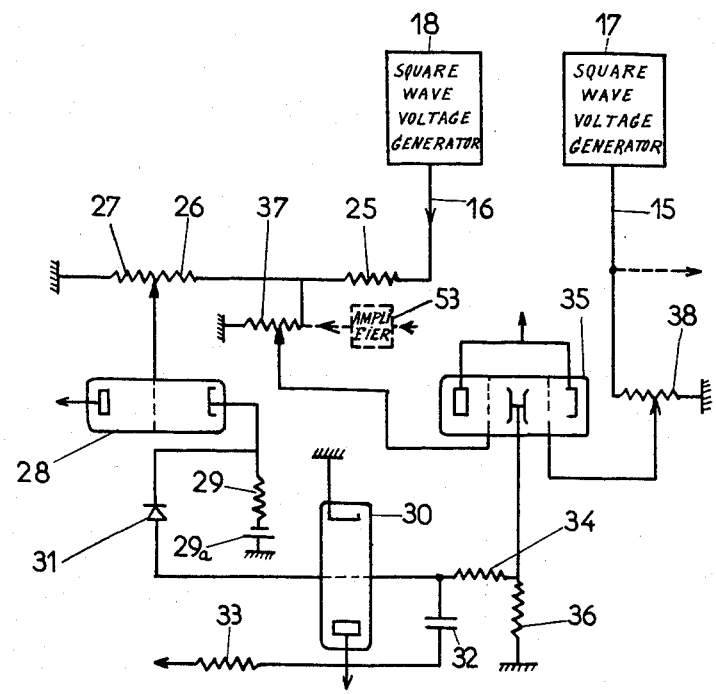
FIG. 3 shows the form of time base circuitry adapted to be incorporated in the device of FIG. 1.

Similarly, multivibrator 18 is switched from state "zero" to state "1" by the first echo pulse A transmitted by a shaping amplifier 20, by a buffer multivibrator 21 and by a differentiating circuit including a capacitor 22 and a resistor 23, and from state "1" to state "zero" by the end-of-sweep pulse already mentioned. FIG. 3 is a preferred embodiment of a time-base generator according to above mentioned indications.

FIGURE 3 illustrates the multivibrators 17 and 18 of FIGURE 1, the output of multivibrator 18 being connected, through resistors 25, 26, 27, to the control grid of tube 28. This tube is arranged in a cathode-follower circuit: its plate is connected, as usual, to a supply source (not illustrated), and its cathode is coupled, on one hand, to a negative potential source 29-$a$ through resistor 29 and, on the other hand, through a diode 31, to the control grid of tube 30.

Tube 30 is arranged in an integrating Miller circuit, i.e. its cathode is grounded, whereas its anode is coupled to its control grid through a capacitor 32 and connected, on the other hand, to the vertical deflection plates of the cathode ray tube in FIGURE 1, through resistor 33.

The control grid of tube 30 is driven, through resistor 34, by the common cathode voltage of a cathode-follower double tube 35, the anodes of which are fed as usual and the cathodes of which are connected in common to the ground through a resistor 36. One of control grids thereof is connected to a central tap of a potentiometer 37 fed by the output 16, the other control grid being connected to the central tap of a potentiometer 38 fed by output 15.

By adjusting the potentiometers 37 and 38 in such a manner that the voltages on the grids of tube 35, which correspond, respectively, to the outputs 16 and 15, are in the same ratio as the speeds $v_1$ and $v_2$, the common cathodes of tube 35 will provide a staircase voltage shaped as shown in solid lines at ($c$), in FIGURE 2.

The Miller-integrator converts this voltage applied to its control grid into the waveform shown at ($a$), in FIGURE 2. As is well known, the waveform of the plate voltage of the Miller integrator is effectively controlled by the waveform of its grid voltage. In practice, it is considered preferable to separate the voltage defining the waveform (as applied to resistor 34) from the bias voltage which is adapted for releasing the flow of current through tube 30, said bias voltage being delivered by tube 28.

If it is desired to obtain an undistorted "cross-sectional view" of the piece under inspection when the latter possesses front face showing a substantial curvature it is necessary to take account of the refraction of the ultrasonic beam from said face.

As shown in FIGURE 4, the propagation speed $v_2$ of the ultrasonic waves inside the piece possesses a vertical component $v_y$ in the direction of the beam in water and a horizontal component $v_x$ connected by the following relations:

$$v_x = v_2 \cdot \sin(r-i)$$
$$v_y = v_2 \cdot \cos(r-i)$$

where $i$ and $r$ are, respectively, the angle of incidence of the beam to the front face 9 and the angle of refraction.

According to an important feature of the invention, the vertical and horizontal scanning speeds on the screen of the cathode ray tube are caused to be substantially equal to said components $v_y$ and $v_x$, respectively.

To achieve this result, a unit 24 is used, as shown symbolically by the dotted block in FIGURE 1.

FIGURE 5 illustrates the details of the circuits according to a preferred embodiment of this unit. The latter comprises, connected at the output of multivibrator 21 of FIGURE 1, an integrator device 39, adapted to provide at its output an upward saw-tooth voltage (waveform ($e$), FIG. 6) the peak amplitudes of which are proportional to the length of the square waves derived from multivibrator 21 (waveform ($d$), FIG. 6).

Waveform ($e$) is applied to a double-threshold peak detector 40 arranged to deliver a voltage ($f$) formed by successive flat portions the amplitudes of which are respectively equal to the values of the peaks of the successive sawteeth ($e$) applied to its imput.

The waveform ($e$) is differentiated by means of a circuit including a capacitor 41 and a resistor 42, thus providing a waveform ($g$) consisting of successive peaks the amplitudes of which are respectively equal to the level differences between the successive flats of waveform ($f$), and of the same polarity as these level differences.

A symmetrical-output amplifier 43 applies, respectively to two double-threshold peak detectors 44 and 45, similar to detector 40, the waveform ($g$) and the waveform ($h$), which are in direct opposition to one another.

A signal ($d_2$), resulting from differentiation, amplification and inversion of signal ($d$) at the output of multivibrator 21, is superimposed to waveforms ($g$) and ($h$), respectively. As shown in FIG. 5, this signal ($d_2$) is generated by a differentiating and amplifying device 21-$a$ and applied to detectors 44 and 45.

These detectors 44 and 45 generate the waveforms ($i$) and ($j$), respectively, shown in dotted lines in FIGURE 6 and applied to two Miller integrators 46 and 47, respectively.

These two Miller integrators are triggered by signals derived from multivibrator 17 and transmitted by a cathode-follower tube 48, through diodes 49 and 50, respectively.

The waveforms at the output of the Miller integrators 46 and 47, each consisting of successive sawteeth the slopes of which are proportional to the amplitudes of the various flat portions or steps of waveforms ($i$) or ($j$), are applied to the respective horizontal deflection plates of the cathode ray tube, as shown in FIGURE 1.

On the other hand, the output voltages of detectors 44 and 45 are applied—as indicated by the connection started in dotted lines in FIG. 3—to potentiometer 37 which provides the voltage which determines the output waveform of the Miller integrator 30, through a network including resistors 51 and 52 and an amplifier 53 (FIG. 5).

The operation of the system described hereinabove is based on the fact that the level differences between successive steps of waveform (f) in FIG. 6 are proportional to the successive values of tan $i$.

In effect, if two successive positions A and B of transducer 2 are considered, one corresponding to the instant of pulse $E_1$ in FIG. 6 and the other to the instant of the following pulse $E_2$, it will be readily seen that the difference $E_1A_1 - E_2A_2$ ($A_1$ and $A_2$ designating the echoes obtained by reflection from the front face of the respective pulses $E_1$ and $E_2$) is proportional to $y$.

$y$ being equal to $x.\tan i$, is therefore proportional to tan $i$ (assuming $x$ to be constant), and thus the level difference mentioned above is also proportional to tan $i$.

Ultimately, it follows that the slopes of the sawteeth at the outputs of the Miller integrators 46 and 47 are proportional to tan $i$ or, if suitable correcting elements are introduced into the circuit, to a certain function of tan $i$.

Such elements may then be approximately determined, for instance by a trial-and-error method, in such a manner that the additional component of the horizontal scanning speed introduced by said integrators should be substantially equal to $v_2.\sin(r-i)$ (account being taken of the fact that: $\sin r = v/v_1.\sin i$ and that the expression: $v_2.\sin(r-i)$ may consequently be transformed into a function of tan $i$).

Similarly, the amplification of the network (51, 52, 53) for instance may be adjusted for the vertical scanning speed to become substantially equal to $v_2.\cos(r-i)$.

It should be noted that these adjustments are not critical in most of these applications and a comparatively rough approximation thereof is quite sufficient.

It was assumed above that $x$ is constant. In fact, practically, the horizontal scanning is generally not linear: in this case, the variations of $x$ must be taken into consideration by introducing into the circuit arrangement suitable compensation networks.

The practical embodiment of the circuit elements described hereinabove is within reach of the skilled man. A preferred embodiment of the double-threshold peak detectors 40, 44 or 45 will nevertheless be described, with reference to FIG. 7 of the drawings.

This detector comprises essentially a cathode-follower tube 54 and an amplifier tube 55 and to the negative terminal of a battery 57, tends to discharge through said tube.

Tube 55 is normally non conducting because of the negative voltage applied to its grid by battery 58, through resistor 59.

When a positive signal is applied to the input terminal 60 of the circuit, it will be transmitted to the grid of tube 55, through resistor 61 and capacitor 62.

The plate of tube 54 is biased by a positive source 63 through a low resistor 64 and connected to the common point of resistor 61 and capacitor 62 through a resistor 66 and, if necessary, an amplifier 65.

The operation of this arrangement may be described as follows: the application to the terminal 60 of a steep-front positive signal results, on one hand, in causing the capacitor 56 to be charged to the peak value of said signal, and, on the other hand, in releasing tube 55, i.e. in tending to cause capacitor 56 to be discharged. In fact, this action of tube 55 is cancelled on account of its being rendered non conductive by the negative voltage, which appears when capacitor 56 is charged, on the plate of tube 54, and which is amplified by amplifier 65.

Capacitor 56 thus remains finally charged at the peak voltage of the signal, maintaining the charge during a comparatively long time relative to the length of the steep-front signal.

When applying a new steep-front signal, of a lower peak amplitude, the capacitor will tend to discharge through tube 55 up to the moment when tube 54 begins to deliver an output, thereby rendering tube 55 non conductive, as explained above. This instant is precisely that when the capacitor is charged to the new peak voltage considered.

If now a further steep-front signal, of a higher peak amplitude than the previous one, is applied, then, on account of the tube 54 delivering an output, tube 55 is rendered non conductive and capacitor 56 is charged up to this new peak voltage.

Ultimately, the voltage across the capacitor is at all times equal to the peak value of the last steep-front signal applied to the input of the circuit.

It is to be understood that a number of modifications and variations may be brought to the examples described, without departing from the spirit and scope of the invention, as defined in the appended claims.

What is claimed is:

1. A system for inspecting objects, comprising: transmitter means for generating electric pulses of ultrasonic frequency; a timing pulse generator coupled to said transmitter means for triggering the same; transducer means, energized by said transmitter means, for transmitting pulses to the object through a coupling medium and receiving echo pulses reflected from said object; a receiver amplifier having an input connected to said transducer means, and an output; a cathode ray tube having vertical and horizontal deflection plates; vertical and horizontal sweep generators respectively connected to said plates; and control means having a first input connected to said timing pulse generator, a second input connected to said receiver amplifier and first and second outputs coupled to said vertical sweep generator, said control means being adapted to provide, at its first output, a first voltage proportional to the propagation speed of the ultrasonic waves in said coupling medium during a first time interval between the transmitted pulse and the return of the first echo pulse reflected from the front surface of the object under inspection and, at its second output, a second voltage proportional to the propagation speed of the ultrasonic waves within said object, during a second time interval between said return of the first echo pulse and the end of the vertical sweep, said vertical sweep generator being adapted to provide a sawtooth voltage having a slope which is proportional to said first and second voltages successively.

2. A system for inspecting objects, comprising: transmitter means for generating electric pulses of ultrasonic frequency; a timing pulse generator coupled to said transmitter means for triggering the same; transducer means, energized by said transmitter means, for transmitting pulses to the object through a coupling medium and receiving echo pulses reflected from said object; a receiver amplifier having an input connected to said transducer means, and an output; a cathode ray tube having vertical and horizontal deflection plates; vertical and horizontal sweep generators respectively connected to said plates; and control means having a first input connected to said timing pulse generator, a second input connected to said receiver amplifier and first and second outputs coupled to said vertical sweep generator, said control means including means for generating, at its first output, a first recurrent squarewave signal the leading edge of which coincides with the transmitted pulse and, at its second output, a second recurrent squarewave signal the leading edge of which coincides with the first of said echo pulses, the trailing edges of said two signals coinciding with the end of the vertical sweep, said vertical sweep generator comprising means for deriving from said squarewave signals a broken-up saw-tooth voltage having two slopes respectively proportional to the propagation speed of the ultrasonic waves in said coupling medium during a first time interval between the transmitted pulse and the return of the first echo pulses reflected from the front surface of the object under inspection and to the propagation speed of the ultrasonic waves within said object, during a second time interval between said return of the first echo pulses and the end of the vertical sweep.

3. A system for inspecting objects, comprising: transmitter means for generating electric pulses of ultrasonic frequency; a timing pulse generator coupled to said transmitter means for triggering the same; transducer means, energized by said transmitter means, for transmitting pulses to the object through a coupling medium and receiving echo pulses reflected from said object; a receiver amplifier having an input connected to said transducer means, and an output; a cathode ray tube having vertical and horizontal deflection plates; vertical and horizontal sweep generators respectively connected to said plates for imparting a scanning motion to the electron beam of the cathode ray tube; first control means having a first input connected to said timing pulse generator, a second input connected to said receiver amplifier and first and second outputs coupled to said vertical sweep generator, said first control means being adapted to provide, at its first output, a first voltage proportional to the propagation speed of the ultrasonic waves in said coupling medium during a first time interval between the transmitted pulse and the return of the first echo pulse reflected from the front surface of the object under inspection and, at its second output, a second voltage proportional to the propagation speed of the ultrasonic waves within said object, during a second time interval between said return of the first echo pulse and the end of the vertical sweep; said vertical sweep generator adapted to provide a sawtooth voltage having a slope which is proportional to the first and second voltages, successively, said system further comprising: scanning means for displacing said transducer along a predetermined direction with respect to said object to scan said object with said transmitted pulses, said horizontal sweep generator generating a voltage proportional to the displacement of said transducer; and second control means having first, second and third outputs, said second and third outputs of the second control means being connected to said horizontal deflection plates, said first output of said second control means being connected to said vertical sweep generator, said second control means being adapted to provide, during said second time interval, an additional horizontal component and a vertical component of the velocity of said scanning motion which are substantially proportional to the components of the velocity of propagation of the ultrasonic waves beam within the object under inspection, parallel and normal to said predetermined direction, respectively.

4. A system for inspecting objects, comprising: transmitter means for generating electric pulses of ultrasonic frequency; a timing pulse generator coupled to said transmitter means for triggering the same; transducer means, energized by said transmitter means, for transmitting pulses to the object through a coupling medium and receiving echo pulses reflected from said object; a receiver amplifier having an input connected to said transducer means, and an output; a cathode ray tube having vertical and horizontal deflection plates; vertical and horizontal sweep generators respectively connected to said plates for imparting a scanning motion to the electron beam of the cathode ray tube; first control means having a first input connected to said timing pulse generator, a second input connected to said receiver amplifier and first and second outputs coupled to said vertical sweep generator, said first control means being adapted to provide, at its first output, a first voltage proportional to the propagation speed of the ultrasonic waves in said coupling medium during a first time interval between the transmitted pulse and the return of the first echo pulse reflected from the front surface of the object under inspection and, at its second output, a second voltage proportional to the propagation speed of the ultrasonic waves within said object, during a second time interval between said return of the first echo pulses and the end of the vertical sweep; said vertical sweep generator adapted to provide a sawtooth voltage having a slope which is proportional to the first and second voltages, successively, said system further comprising scanning means for displacing said transducer along a predetermined direction with respect to said object, to scan said object with said transmitted pulses, said horizontal sweep generator generating a voltage proportional to the displacement of said transducer; and second control means comprising means for producing two voltages formed each with successive steps having amplitudes proportional, respectively, to the successive values of the tangent of the angle of incidence of the ultrasonic beam on said front surface and means for generating, from said two voltages, during said second time interval, an additional horizontal component and a vertical component of the velocity of said scanning motion which are substantially proportional to the components of the velocity of propagation of the ultrasonic wave beam within the object under inspection, parallel and normal to said predetermined direction, respectively.

5. A system for inspecting objects, comprising: transmitter means for generating electric pulses of ultrasonic frequency; a timing pulse generator coupled to said transmitter means for triggering the same; transducer means, energized by said transmitter means, for transmitting pulses to the object through a coupling medium and receiving echo pulses reflected from said objects; a receiver amplifier having an input connected to said transducer means, and an output; a cathode ray tube having vertical and horizontal deflection plates; vertical and horizontal sweep generators respectively connected to said plates for imparting a scanning motion to the electron beam of the cathode ray tube; and control means comprising: a buffer device having an input connected to the output of said receiver amplifier, a further input connected to the output of said timing pulse generator and an output; end-of-sweep threshold means connected to said vertical sweep generator for providing a pulse at each end of the vertical sweep, said end-of-sweep threshold means having an output; a first multivibrator having an input connected to the output of said timing pulse generator, a further input connected to the output of said end-of-sweep pulse generating means, said first multivibrator having an output; a second multivibrator having an input connected to the output of said end-of-sweep pulse generating means, an output, and a further input; a capacitor-resistor differentiating circuit connecting the output of said buffer device to said further input of the second multivibrator; said vertical sweep generator comprising a Miller integrator and means connecting the outputs of said first and second multivibrators to said Miller integrator, for deriving from the last mentioned outputs, first and second voltages respectively proportional to the propagation speed of the ultrasonic waves in said coupling medium during a first time interval between the transmitted pulse and the return of the first echo pulse reflected from the front surface of the object under inspection, and to the propagation speed of the ultrasonic waves within said object, during a second time interval between said return of the first echo pulse and the end of the vertical sweep.

6. A system for inspecting objects, comprising: transmitter means for generating electric pulses of ultrasonic frequency; a timing pulse generator coupled to said transmitter means for triggering the same; transducer means, energized by said transmitter means, for transmitting pulses to the object through a coupling medium and receiving echo pulses, reflected from said object; a receiver amplifier having an input connected to said transducer means, and an output; a cathode ray tube having vertical and horizontal deflection plates; vertical and horizontal sweep generators respectively connected to said plates for imparting a scanning motion to the electron beam of the cathode ray tube; first control means comprising: a buffer device having an input connected to the output of said receiver amplifier, a further input connected to the output of said timing pulse generator and an output; end-of-sweep threshold means connected to said vertical sweep generator for providing a pulse at each end of the vertical sweep, said end-of-sweep threshold means having an output; a first multivibrator having an input connected to the output of said timing pulse generator, a further input connected to the output of said end-of-sweep pulse generating means, said first multivibrator having an output; a second multivibrator having an input connected to the output of said end-of-sweep pulse generating means, an output, and a further input; a capacitor-resistor differentiating circuit connecting the output of said buffer device to said further input of the second multivibrator; said vertical sweep generator comprising a first Miller integrator and means, connecting the outputs of said first and second multivibrators to said Miller integrator; for deriving, from the last mentioned outputs, first and second voltages respectively proportional to the propagation speed of the ultrasonic waves in said coupling medium during a first time interval between the transmitted pulse and the return of the first echo pulse reflected from the front surface of the object under inspection and to the propagation speed of the ultrasonic waves within said object, during a second time interval between said return of the first echo pulse and the end of the vertical sweep, said system further comprising scanning means for displacing said transducer along a predetermined direction with respect to said object to scan said object with said transmitted pulses, said horizontal sweep generator generating a voltage proportional to the displacement of said transducer, and second control means, said second control means including an integrating circuit connected to the output of said buffer device; a first double-threshold peak detector unit connected to said integrating circuit; a differentiating circuit connected to said first detector unit; a symmetrical-output amplifier having an input connected to said differentiating circuit and first and second outputs; second and third double-threshold peak detector units having inputs and outputs, said inputs being respectively connected to said first and second outputs of the differentiating circuit; second and third Miller integrators having inputs respectively connected to the respective outputs of said second and third detector units and outputs; a further differentiating circuit having an input connected to the output of said buffer device, and an output connected to said second and third detector units; a cathode-follower unit having an input connected to said first multivibrator and two outputs respectively connected to the respective inputs of said second and third Miller integrators; means, connecting the outputs of said second and third Miller integrators to said horizontal deflection plates, whereby an additional horizontal component of the velocity of said scanning motion is provided, said component being substantially proportional to the component of the velocity of propagation of the ultrasonic wave beam within the object under inspection, parallel to said predetermined direction; and means connecting the outputs of said second and third detectors to said vertical sweep generator, whereby the vertical component of the velocity of said scanning motion is made substantially proportional, during said second time interval, to the component of the velocity of propagation of said ultrasonic wave beam normal to said predetermined direction.

References Cited by the Examiner
UNITED STATES PATENTS 3,005,335  10/61  Erdman _____73—67.8

RICHARD C. QUEISSER, *Primary Examiner.*

JOSEPH P. STRIZAK, *Examiner.*